April 20, 1937.  J. W. SHIELDS  2,078,167
LINK BELT
Filed June 23, 1933
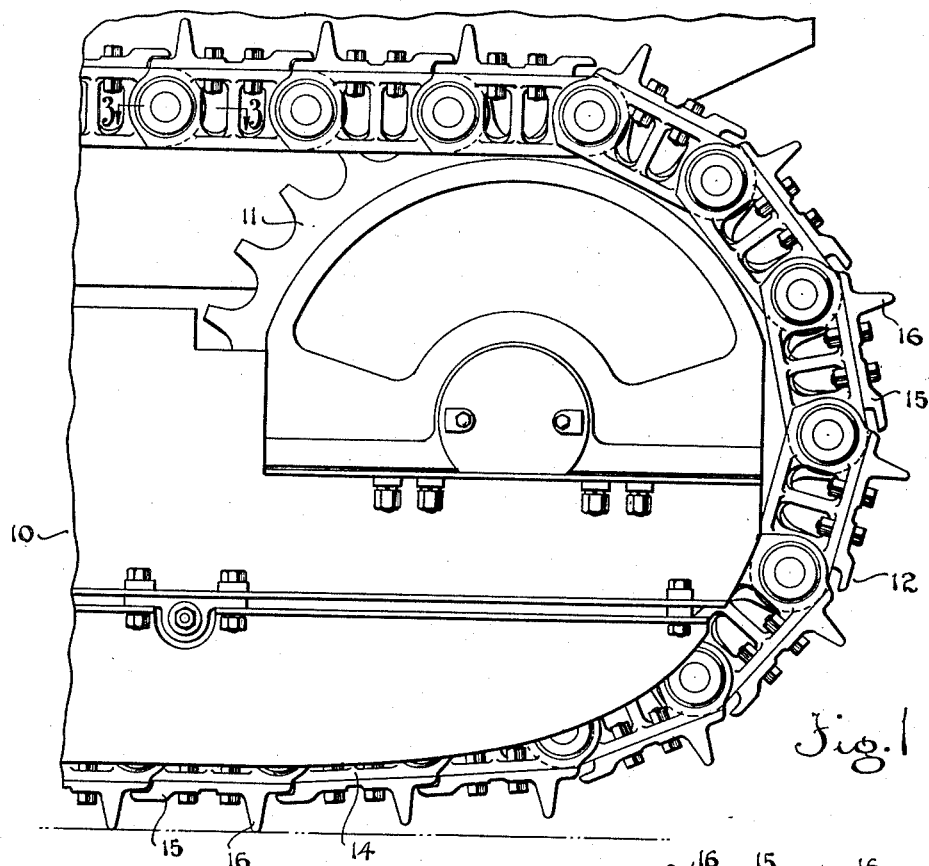
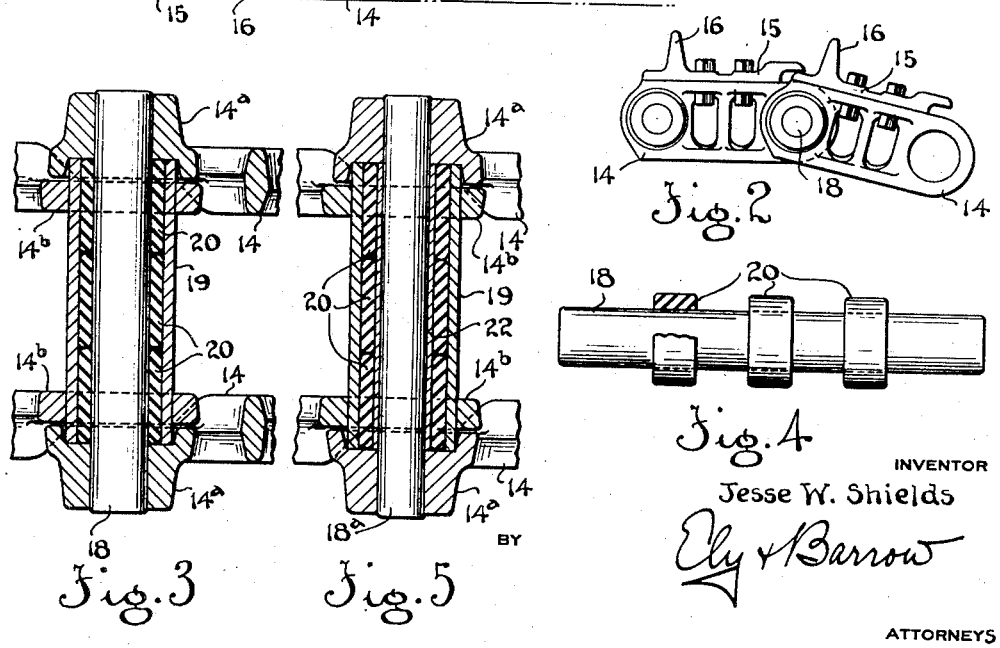
INVENTOR
Jesse W. Shields
Ely & Barrow
ATTORNEYS Patented Apr. 20, 1937

2,078,167

UNITED STATES PATENT OFFICE 2,078,167

LINK BELT

Jesse W. Shields, Akron, Ohio, assignor to The Firestone Tire & Rubber Company, Akron, Ohio, a corporation of Ohio Application June 23, 1933, Serial No. 677,216

6 Claims. (Cl. 305—10)

This invention relates to link belts such as, for example, the endless link belts constituting the propelling means for certain kinds of tractors, and more especially it relates to link belts having pivotal connections comprising rubber between adjacent links of the belt.

The chief objects of the invention are to provide an improved pivotal connection of the character mentioned, for use with link belts; and to provide an improved link belt. More specifically, the invention aims to provide an endless link belt having rubber in its pivotal connections between links, which rubber will not be subject to as great torsional distortion as heretofore. Other objects will be manifest.

Of the accompanying drawing:

Figure 1 is a fragmentary side elevation of a tractor, and a link driving belt, embodying the invention in its preferred form, mounted thereon;

Figure 2 is a side elevation of two connected links of the belt in normal angular relation;

Figure 3 is a section on the line 3—3 of Figure 1;

Figure 4 is an elevation of the spindle element of a pivotal connection before it is assembled therewith; and Figure 5 is a section similar to Figure 3, showing a modified embodiment of the invention.

Referring to the drawing, 10 is one end portion of the frame of a tractor, 11 is a sprocket journaled therein, and 12 is a link belt or track for crawler type tractors, trained about said sprocket, it being understood that the link belt is endless and is trained about another sprocket (not shown) similar to sprocket 11, at least one of the sprockets being power-driven.

The belt 12 comprises a multiplicity of lateral links or members 14, 14, said links being arranged in two parallel series that are held in spaced apart relation by connections that pivotally secure adjacent links of each series to each other, said connections also being engaged by the teeth of sprockets upon which the belt is mounted. Tread plates 15, each formed with a projecting lug or cleat 16, are mounted upon the corresponding lateral link 14 of each series, said tread plates spanning the space between each series of plates 14.

As is clearly shown in Figure 3, the pivotal connections between lateral links 14 of the belt each comprise a spindle 18, a sleeve 19 of somewhat shorter length and greater diameter concentric therewith and spaced therefrom, and one or more cushions 20, 20 of resilient rubber composition between the spindle 18 and sleeve 19. In the embodiment of the invention herein shown there are three rubber cushions 20, and they are vulcanized to the spindle 18 in spaced apart relation as shown in Figure 4. Said cushions normally are of larger diameter than the inside diameter of the sleeve 19, and in assembling the spindle with the sleeve, which is accomplished by forcing the spindle axially thereinto, the cushions 20 are deformed by radial pressure so that they spread axially and fill the space between spindle and sleeve.

The force exerted by the deformed cushions 20 against the sleeve 19 assures frictional engagement between these parts sufficient to prevent slippage during substantial relative angular movement between spindle 18 and sleeve 19, with the result that such relative angular movement imposes a torsional strain on the cushions 20. The lateral links 14 are so formed that their end portions overlap, as shown in Figure 3, when they are assembled to form an endless belt. The leading ends of the links 14 are designated 14a and the trailing ends thereof are designated 14b, the leading ends of the links beings outermost where said links overlap. The end portions of the links are formed with suitable apertures to receive the pivotal connections that hold the links in assembled relation. When the belt is assembled, the trailing ends 14b of the links 14 engage the sleeves 19 of the pivotal connections, and the leading ends 14a of the links engage the spindles 18 of said connections. The pivotal connections have a force fit with both the leading and trailing ends of the links 14, so that pivotal movement of the links angularly with relation to each other causes similar relative movement of the sleeves 19 and spindles 18 of the pivotal connections, and imposes a torsional strain upon the cushions 20.

The links 14 are so assembled on the pivotal connections that adjacent links are disposed at an angle to each other, as shown in Figure 2. This angle may vary in different situations, but preferably it is approximately one-half the angular displacement which adjacent belt links undergo in passing around the sprocket 11, Figure 1. Thus in passing around a sprocket, the cushions 20 of the pivotal connections are subjected only to one-half the torsional strain they would otherwise normally be subjected to. In the straight reaches of the belt between sprockets the adjacent belt links are in horizontal alignment, with the result that the cushions 20 are placed under torsional strain that is of approximately the same extent as the strain imposed in passing around a sprocket, but in the opposite direction.

Thus when the improved belt is arranged in endless form and mounted for use upon sprockets, the rubber in the pivotal connections of the belt links normally will be under torsional strains, which in some positions will be opposite in direction to what it is in other positions. In all cases however, the maximum extent of deformation of the rubber will be but approximately one-half of what it would be if the links were assembled in straight alignment and not at an angle to each other.

The feature of vulcanizing the rubber cushions 20 to spindles 18 and deforming the cushions by forcing them into a sleeve 19 of smaller inside diameter than the diameter of the cushions is especially advantageous in that it lends itself to simple manufacturing methods as distinguished from methods requiring vulcanization of the rubber to the inner surface of the outer sleeve. Applicant's construction also provides a relatively larger surface area for the frictional engagement of rubber and metal, so that there is no slippage therebetween when spindle and sleeve move relatively of each other.

In the embodiment of the invention illustrated in Figure 5, the cushions 20 are vulcanized upon an inner sleeve 22, and inner sleeve 22 with the cushions 20 thereon is forced into outer sleeve 19. Spindle 18a is force-fitted into sleeve 22 during the assembly of the link belt. This type of connection is especially useful for joining the ends of a link belt to make it endless.

The invention makes for longer life of link belts for various uses in that the strains imposed on the rubber cushions of the pivotal connections are minimized. The invention also achieves the other advantages set out in the foregoing statement of objects. The invention has been specifically described in connection with a track construction for crawler type tractors. It will be understood, however, that the features of the invention may be employed in other relations where link belts are utilized.

Modification may be resorted to without departing from the spirit of the invention or the scope of the appended claims.

What is claimed is:

1. In a link belt the combination of a plurality of links, and pivotal connections between said links, each of said connections comprising an axial spindle, a sleeve circumscribing the same and spaced therefrom, and a bushing of rubber between said spindle and sleeve and having its inner portion vulcanized to said spindle and its outer portion frictionally secured to said sleeve and adapted to resist angular movement therebetween by torsion of the rubber, one end of each link being fixed to a spindle of a connection and the other end of the link being fixed to a sleeve of an adjacent connection, the adjacent links being disposed at a determinate angle to each other and the rubber bushings being free from torsional strain, said angle being such that the rubber bushing is put under torsional strain in one direction in passing around a sprocket wheel and put under torsional strain in the opposite direction in the straight reaches of the belt between sprocket wheels.

2. In a link belt, the combination of a plurality of links, and pivotal connections between said links, each of said connections comprising a rubber bushing adapted to resist relative angular movement of adjacent links by torsion of said rubber bushing, the adjacent links being disposed at a determinate angle with relation to each other and the rubber bushing being without torsional strain, said angle being greater than the angle between adjacent links as the latter pass around a sprocket wheel, and less than the angle between adjacent links in the straight reaches of the belt between sprocket wheels.

3. A combination as defined in claim 2 wherein the angular displacement from alignment of adjacent links is one-half the angular displacement from alignment of adjacent links passing about a sprocket wheel, whereby the rubber bushings are subjected to torsional strains alternately in opposite directions during use.

4. In a link belt the combination of a plurality of links, and pivotal connections between said links, each of said connections comprising an axial spindle, a sleeve circumscribing the spindle and spaced therefrom, and a bushing of rubber between said spindle and sleeve and having its inner portion vulcanized to said spindle and its outer portion frictionally secured to said sleeve, said rubber bushing at the time of vulcanization being of larger diameter than the inside diameter of said sleeve and being forced axially into said sleeve to place the rubber under constant radial compression, thereby resisting angular movement between the spindle and sleeve by torsion of the rubber, one end of each link being fixed to a spindle of a connection and the other end of the link being fixed to a sleeve of an adjacent connection to thereby assure the imposition of torsional strains only upon the rubber during relative angular movement of the spindle and sleeve.

5. In a link belt the combination of a plurality of links, and pivotal connections between said links, each of said connections comprising an axial spindle, a sleeve circumscribing the spindle and spaced therefrom, and a bushing of rubber between said spindle and sleeve and having its inner portion vulcanized to said spindle and its outer portion frictionally secured to said sleeve, said rubber bushing at the time of vulcanization being of larger diameter than the inside diameter of said sleeve and being forced axially into said sleeve to place the rubber under constant radial compression and axial tension, thereby resisting angular movement between the spindle and sleeve by torsion of the rubber, adjacent links being pivotally joined together to assure the imposition of torsional strains only upon the rubber during relative angular movement of the sleeve about the axis of the spindle, the adjacent links being assembled at a determinate angle to each other with the rubber bushings being free from torsional strain, said angle being such that, during travel of the belt, the rubber bushing is subjected to torsional strain in one direction when the belt passes around a sprocket wheel and in the opposite direction in the straight reaches of the belt between sprocket wheels.

6. In a link belt the combination of a plurality of links, and pivotal connections between said links, each of said connections comprising an axial spindle, a sleeve circumscribing the spindle and spaced therefrom, and a bushing of rubber between said spindle and sleeve and having its inner portion vulcanized to said spindle and its outer portion frictionally secured to said sleeve, said rubber bushing at the time of vulcanization being of larger diameter than the inside diameter of said sleeve and being forced axially into said sleeve to place the rubber under constant radial compression, thereby resisting angular movement between the spindle and sleeve by torsion of the rubber, one end of each link being fixed to a spindle of a connection and the other end of the link being fixed to a sleeve of an adjacent connection to thereby assure the imposition of torsional strains only upon the rubber during relative angular movement of the spindle, the adjacent links being assembled at a determinate angle to each other with the rubber bushings being free from torsional strain, said angle being such that, during travel of the belt, the rubber bushing is subjected to torsional strain in one direction when the belt passes around a sprocket wheel and in the opposite direction in the straight reaches of the belt between sprocket wheels.

JESSE W. SHIELDS.